United States Patent [19]
Burtch et al.

[11] Patent Number: 5,519,255
[45] Date of Patent: May 21, 1996

[54] VEHICLE ANTI-HIJACKING AND ANTI-THEFT DEVICE

[76] Inventors: Timothy A. Burtch; David F. Carey; Peter E. Asaro; Wilson S. Fickle, all of 7595 Gayneswood Way, San Diego, Calif. 92139

[21] Appl. No.: 218,263

[22] Filed: Mar. 24, 1994

[51] Int. Cl.⁶ ................................................. B60R 25/00
[52] U.S. Cl. ........................................ 307/10.2; 180/287
[58] Field of Search ................................ 307/9.1–10.6, 307/120; 361/170, 195; 73/1 D, 1 DV, 488, 509, 518; 123/198 DB, 198 DC; 180/287, 289; 324/160, 161, 178, 179, 180; 340/426, 441, 825.31, 825.32

[56] References Cited

U.S. PATENT DOCUMENTS

| | | | |
|---|---|---|---|
| 3,665,386 | 5/1972 | Dosch | 180/287 |
| 3,790,933 | 2/1974 | Cort | 180/287 |
| 4,236,142 | 11/1980 | Lindsey | 180/287 |
| 4,240,516 | 12/1980 | Henderson et al. | 180/289 |
| 4,691,801 | 9/1987 | Mann et al. | 180/287 |
| 5,049,867 | 9/1991 | Stouffer | 340/426 |
| 5,307,048 | 4/1994 | Sonders | 340/426 |
| 5,315,286 | 5/1994 | Nolan | 340/426 |
| 5,444,430 | 8/1995 | McShane | 307/10.2 |

*Primary Examiner*—William M. Shoop, Jr.
*Assistant Examiner*—Richard T. Elms
*Attorney, Agent, or Firm*—Thomas J. Tighe

[57] ABSTRACT

A "normal mode" allows a hijacker to drive away but disables the vehicle after a short delay. An optional "valet mode" allows others, e.g. parking attendants and mechanics, a limited driving period that when exceeded causes vehicle shut-down that cannot be overcome without actuating a hidden switch. One embodiment has both modes and includes: a switch for arming the system in the normal mode; an element, responsive to a hijacking event, e.g. a door opening, when the system is armed in the normal mode, for measuring a "hijack delay", preferably three minutes; an element for producing a first signal at the expiration of the hijack delay; an element responsive to said first signal for disabling the vehicle; an element for arming the system in the valet mode; a valet mode element for preventing disablement of the vehicle in response to the first signal; an element for sensing vehicle motion and producing a second signal in response thereto; a valet mode element responsive to the second signal for measuring a "valet delay"; an element for producing a third signal at the expiration the valet delay, the valet delay measuring element being disabled whenever the second signal is not extant; and an element responsive to the third signal for disabling the vehicle. This embodiment can also include an element responsive to the second signal for preventing disablement of the vehicle in either mode until the second signal is no longer extant.

17 Claims, 2 Drawing Sheets

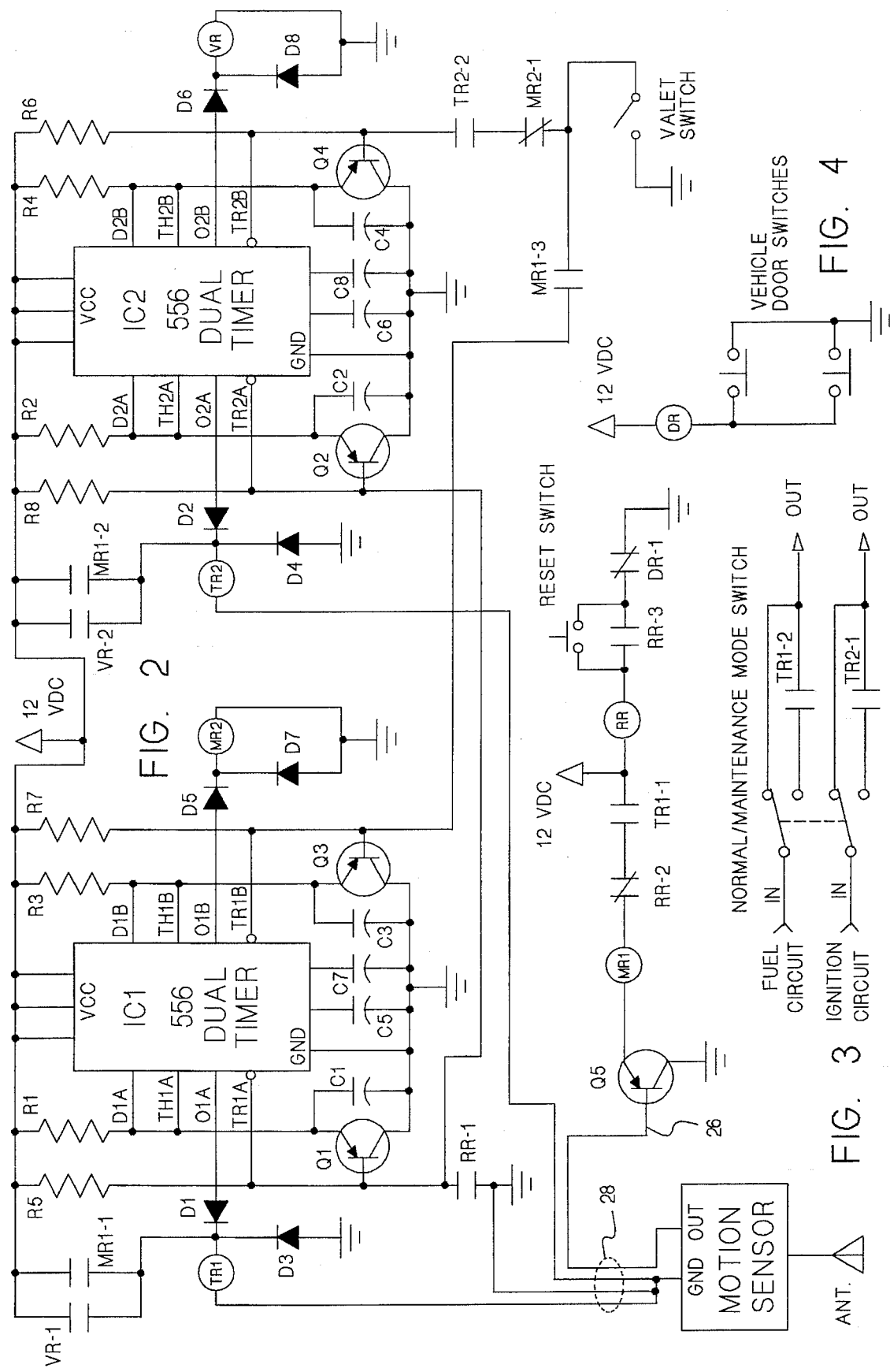

VEHICLE ANTI-HIJACKING AND ANTI-THEFT DEVICE

BACKGROUND OF THE INVENTION

This invention relates in general to devices used to disable a vehicle in order to prevent hijacking (commonly called carjacking when an automobile is involved) and theft of the vehicle.

This invention is an anti-hijacking and theft deterrent system for self-propelled vehicles, such as automobiles and trucks. If a vehicle containing this system is hijacked while the system is armed in a "normal" mode, the system allows the hijacker to drive away from the victim, but subsequently disables the vehicle after a short delay. After the delay the system takes control and shuts down the vehicle rendering it non-operational.

A significant advantage of this invention over the prior art is that it requires no action on the part of the driver or passengers to activate the delayed disabling feature. A driver need only comply with the usual demands of a hijacker, that is, get out of the vehicle leaving the keys. The carjacker then takes control of the vehicle and drives away, unaware that the disabling feature has been actuated, and puts a safe distance between himself or herself and the driver victim.

The system also has a "valet" mode that allows others, such as parking lot attendants and garage mechanics, limited driving. If the limit is exceeded at any time the vehicle shuts-down and cannot be restarted without actuating a hidden switch.

The system also discourages theft of a vehicle while it is parked and not in operation. Depending on the system's mode setting, the system either prevents a thief from starting the engine, or will shut-down the engine at the first stop the vehicle makes after a short time period from when the vehicle was started.

Other advantages and attributes of this invention will be readily discernable upon a reading of the text hereinafter.

SUMMARY OF THE INVENTION

It is an object of this invention to provide an anti-hijacking and theft deterrent system for self-propelled vehicles, such as automobiles and trucks.

It is a further object of this invention to provide such a system for self-propelled vehicles having a vehicle disabling feature that allows a hijacker to drive away from the victim, but subsequently disables the vehicle after a short delay.

It is a further object of this invention to provide such a system for self-propelled vehicles having a vehicle disabling feature as described above that requires no action on the part of the driver or passengers to activate the delayed disabling feature.

It is a further object of this invention to provide such a system for self-propelled vehicles having a vehicle disabling feature as described above that can be activated by the opening of a vehicle door.

It is a further object of this invention to provide such a system for self-propelled vehicles having a mode in which a non-owner can be given control of a vehicle but be limited by the system to driving periods of less than or equal to a pre-set time limit, and in which the system disables the vehicle if a driving period exceeds the limit.

It is a further object of this invention to provide such a system for self-propelled vehicles that either prevents a thief from starting the vehicle's engine, or will shut-down the engine at the first stop the vehicle makes after a short time period from when the vehicle was started.

These objects, and others expressed or implied in this specification, are accomplished by a vehicle security device having: a circuit for arming the device; a circuit responsive to an event (preferably a vehicle door opening which would occur during a hijacking) when the device is armed, for measuring a pre-set time period (a "hijack delay"—preferably three minutes) from the event; a circuit for producing a first signal at the expiration of the hijack delay; and a circuit responsive to the first signal for disabling the vehicle. Optionally the security device can include a circuit for sensing vehicle motion and for producing a second signal in response thereto, and a circuit responsive to the second signal for preventing disablement of the vehicle until the second signal is no longer extant. One embodiment of the vehicle security device has at least two modes of operations, a "normal mode" and "valet mode", and includes: a circuit for arming the device in the normal mode; a circuit responsive to an event (preferably a door opening) when the device is armed in the normal mode for measuring a first pre-set time period, the hijack delay; a circuit for producing a first signal at the expiration of the hijack delay; a circuit responsive to the first signal for disabling the vehicle; a circuit for arming the device in the valet mode; a valet mode circuit for preventing disablement of the vehicle in response to the first signal; a circuit for sensing vehicle motion and producing a second signal in response thereto; a valet mode circuit responsive to the second signal for measuring a second pre-set time period ("valet delay"); a circuit for producing a third signal at the expiration the valet delay, the valet delay measuring circuit being disabled whenever the second signal is not extant (the vehicle is not moving); and a circuit responsive to the third signal for disabling the vehicle. This last described embodiment can also include a circuit responsive to the second signal (indicating vehicle motion) for preventing disablement of the vehicle in either mode until the second signal is no longer extant.

BRIEF DESCRIPTION OF THE DRAWINGS

FIG. 2 is a schematic diagram of the main circuit of an embodiment of a system according to this invention.

FIG. 3 is a schematic diagram illustrating the system's interaction with a vehicle's pre-existing fuel and ignition circuits.

FIG. 4 is a schematic diagram illustrating the system's interaction with the opening and closing of a vehicle's doors.

DESCRIPTION OF THE PREFERRED EMBODIMENT

Figure 1:
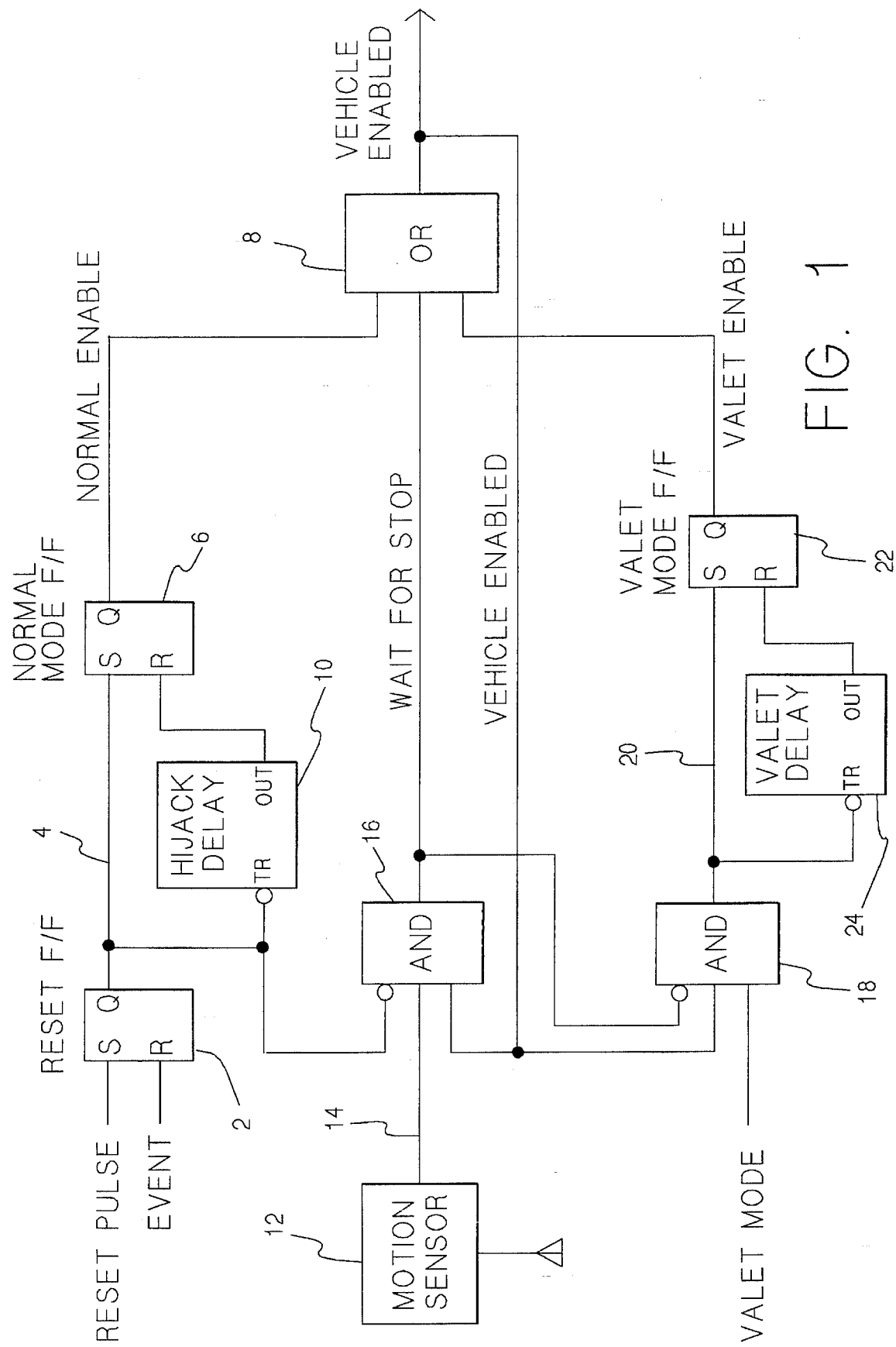
FIG. 1 is a functional block diagram of the basic and optional components of a system according to this invention.

As an overview, this system has three modes: a normal mode, a valet mode and a maintenance mode. To put the system into the normal mode a driver simply gets in the vehicle, closes all the doors and actuates a hidden reset switch. The location of this switch is preferably selected by a vehicle's owner when the system is installed in the vehicle. Resetting the system allows the vehicle to be started and arms the system to respond to a hijacking. Subsequent opening of any door triggers a disabling feature which includes a three minute timer. Three minutes after a door is opened the system checks to see if the vehicle is in motion. If the vehicle is in motion nothing happens, but as soon as the vehicle comes to a stop, i.e., no motion is detected, the vehicle's engine is disabled. Thereafter the engine cannot be restarted until the hidden reset switch is actuated.

To put the system in the valet mode, a driver simply toggles an internal valet switch before opening a door. The valet switch need not be hidden. The valet mode allows a person who is unaware of the system and the location of the reset switch, such as a parking attendant, three minutes of continuous driving, e.g. to park the vehicle. If the vehicle is stopped within the three minutes, e.g. when it is parked, it remains enabled and can be driven again. Since the vehicle remains enabled while it is parked, the vehicle can subsequently be retrieved without the need to actuate the reset switch. To clear the valet mode and return to the normal mode a driver closes the vehicle's doors, actuates the hidden reset switch, and toggles off the valet switch. If the driver forgets to reset the system, the car engine will stop after there has been three minutes of continuous motion and after the vehicle has come to its first stop. Should the vehicle become stolen while parked in the valet mode, the disabling feature is triggered causing shut-down of the vehicle's engine after three minutes have elapsed and the vehicle is not in motion, i.e., at the first stop after the three minute delay has elapsed. Should the thief discover the valet switch and turn it off, it will not prevent the system from shutting-down the vehicle after a short time.

The maintenance mode is a complete bypass of the entire system. With the use of a hidden key-operated switch, the system can be completely deactivated. The purpose of this switch is for long term maintenance, e.g., body work on the vehicle, or if the system experiences a malfunction. For routine maintenance such as oil change, tune-ups, etc., it is preferred that the valet mode be used.

Referring to FIG. 1, a functional block diagram of the system is illustrated. In its simplest form the system has a reset switch (not shown) which when actuated, produces a reset pulse that sets a first memory device 2 illustrated here as a set/clear flip-flop (RESET F/F). This memory device remembers that the reset switch has been momentarily actuated and has an output 4 which sets a second memory device 6, also illustrated as a flip-flop (NORMAL MODE F/F). The second memory device remembers that the system is in the normal mode and when set produces a continuous signal (NORMAL ENABLE) which is used to enable the vehicle. Although FIG. 1 shows NORMAL ENABLE going to a logical "or" gate, in its simplest form the system does not include the "or" gate 8 and the NORMAL ENABLE signal is the same as the illustrated VEHICLE ENABLED signal. The VEHICLE ENABLED is communicated to a circuit (not shown) which enables the vehicle to be driven and stopped at will, indefinitely. If an event subsequently occurs, such as a door opening during a hijacking, the event will produce a signal (EVENT) that clears the first memory device 2, removing the set signal from the normal mode flip-flop and triggering a delay circuit 10 (HIJACK DELAY). After the preferably three minutes, the output of the hijack delay circuit will clear the normal mode flip-flop. At this point the vehicle becomes disabled and undriveable, unless the system includes a motion sensor circuit as described next.

Referring again to FIG. 1, optionally the system can have a motion sensor 12 which produces a motion signal 14 whenever the vehicle is in motion. In this case the output of the normal mode flip-flop (NORMAL ENABLE) goes to the "or" gate 8 causing the "or" gate to produce the VEHICLE ENABLED signal. If the reset flip-flop 2 has been cleared because of the occurrence of an EVENT signal, and the VEHICLE ENABLED signal is still true (because the hijack delay has not timed-out to clear the normal mode flip-flop), the motion signal 14 will produce a signal (WAIT FOR STOP) via a logical "and" gate 16. This WAIT FOR STOP signal goes to the "or" gate and thereby keeps the vehicle enabled until the motion signal is no longer true.

Referring again to FIG. 1, a further option is the valet mode. A signal (VALET MODE) is produced by toggling-on a valet switch (not shown). If the VALET MODE signal is true and the VEHICLE ENABLED signal is true (indicating that the system is still enabled from the normal mode) and the vehicle is not in motion (indicated by the false condition of the WAIT FOR STOP signal) an "and" gate 18 produces a signal 20 that sets a third memory device, illustrated here as a flip-flop (VALET MODE F/F), which remembers that the system is in the valet mode. The valet mode flip-flop when set also produces a signal (VALET ENABLE) which enables the vehicle via the "or" gate 8. The VALET ENABLE signal will keep the vehicle enabled even though the NORMAL ENABLE signal subsequently goes false because an event has occurred (such as opening a door to give the vehicle to an attendant). When the vehicle is subsequently driven, the motion signal 14 will produce the WAIT FOR STOP signal that removes the set signal 20 from the valet mode flip-flop. This removal also triggers a valet delay circuit (VALET DELAY) which after a pre-set delay will clear the valet mode flip-flop and remove the VALET ENABLE signal. However, if the vehicle is stopped before the valet delay times-out, the WAIT FOR STOP signal will again go false causing a return of the set signal 20 that in turn cancels the valet delay time-out to keep the valet mode flip-flop set. When the vehicle is again driven, the valet delay circuit is again triggered. As long as the driving periods of the vehicle do not exceed the valet delay, the vehicle will remain enabled, at least until the valet switch is toggled off. However if any driving period exceeds the valet delay, the valet mode flip-flop will be cleared, disabling the vehicle until the hidden reset switch is again actuated.

Referring to FIGS. 2-4, an embodiment of the system is illustrated in greater detail. This embodiment has two major components, IC1 and IC2, of this embodiment are each a conventional 556 integrated circuit, such as an SE556 or an LM556. Within a 556 are two independent circuits, each circuit having at least two inputs commonly referred to as a "threshold" input and a "trigger" input. These inputs control the setting and clearing of an internal flip-flop. A 556 also has a bipolar voltage output and a "discharge" output which is the collector of a transistor having a common emitter. The independent circuits of each 556 shall be referred to herein as an "A" circuit and a "B" circuit.

Referring to FIGS. 3 and 4, a vehicle having a system according to this invention installed has one or more switches, preferably one for each vehicle door, each of which is actuated whenever its respective door is open. Illustrated are two vehicle door switches each of which is closed whenever its respective door is open. The closing of either door switch provides a ground path for energizing a door relay DR which is connected for energy to a supply voltage, preferably a vehicle battery such as a 12 VDC battery found in most automobiles. This opens normally-closed door relay contacts DR-1. Thus, whenever all the vehicle doors are closed contacts DR-1 are also closed, and whenever any vehicle door opens contacts DR-1 also open. The Normal/Maintenance Mode Switch is used to bypass the system whenever the vehicle is required to be serviced or repaired, and is illustrated to be positioned in the maintenance mode.

Referring to the FIGS. 2–4, when the doors of the vehicle are closed and the reset switch is momentarily actuated, i.e., closed, a ground path to the reset relay RR is competed and the relay is thereby energized. This causes normally-open contacts RR-3 of the reset relay to close and provide a ground path that bypasses the reset switch, thereby latching the relay in the energized state. Energization of the reset relay also applies a ground potential to the bases of transistors Q1 and Q2 by closure of normally-open contacts RR-1. The ground potential at their bases forward biases Q1 and Q2 allowing them to conduct. The collectors of Q1 and Q2 are connected to ground, and connected from the emitters of Q1 and Q2 to ground are capacitors C1 and C2, respectively. The emitters and non-ground sides of the capacitors are also connected to the supply voltage (12 VDC) through resistors R1 and R2, respectively, and to two "A" circuit inputs of IC1 and IC2, respectively: threshold inputs TH1A and TH2A, and discharge inputs D1A and D2A. Preferably Q1 and Q2 are biased into saturation by the closure of RR-1, and as long as they are so biased, the just-listed inputs will be substantially at ground potential, and capacitors C1 and C2 will have substantially no charge.

Trigger inputs TR1A and TR2A are connected to the non-ground contact of reset relay contacts RR-1 and to 12 VDC through resistors R5 and R8, respectively. When contacts RR-1 are open the trigger inputs are at voltages above the respective internal trigger levels of IC1 and IC2 (which for 556 devices is typically VCC/3). The closure of RR-1 drops the trigger inputs to ground potential which causes the respective outputs, O1A and O2A, of IC1 and IC2 to rise to voltages near the supply voltage. The outputs are connected to respective timer relays, TR1 and TR2, and the increases in the output voltages energize the timer relays. Energization of TR1 closes normally-open contacts TR1-2 which removes a disabling discontinuity in the fuel circuit. Energization of TR2 closes normally-open contacts TR2-1 which removes a disabling discontinuity in the ignition circuit. With the discontinuities removed, the vehicle is enabled to operate normally as long as the doors remain closed.

Thus the actuation of the reset switch with all vehicle doors closed and the resultant energization of the timer relays TR1 and TR2 puts the system is in its normal mode, i.e., armed to respond whenever a vehicle door is opened.

When the system is in its normal mode, the opening of any vehicle door (as would happen if the vehicle was being hijacked) triggers the system to begin measuring a pre-set time period, preferably three minutes. A door opening causes the normally-closed door relay contacts DR-1 to open, as explained above, breaking the ground connection of the reset relay and thereby de-energizing it. This opens the reset relay contacts RR-1. The opening of RR-1 brings the trigger inputs of IC1 and IC2 back to a level higher than their respective internal trigger levels, and removes the ground potential at the bases of transistors Q1 and Q2 thereby placing them in cutoff. With Q1 and Q2 not conducting, capacitors C1 and C2 are allowed to charge through respective resistors R1 and R2. The pre-set time period is a function of the R1C1 and R2C2 time constants which are preferably equal within conventional tolerances. The conclusion of the time period occurs when C1 and C2 charge to voltage levels greater than the internal threshold voltages of IC1 and IC2, respectively, causing the outputs, O1A and O2A, of IC1 and IC2 to drop to a voltage near ground. For 556 devices the internal threshold level is nominally 2/3 VCC. This removes IC1 and IC2 as respective sources of energization for TR1 and TR2. However, if the vehicle is in motion at the expiration of the time period (as would be the case if a hijacker forced the opening of a door, commandeered the vehicle and began driving away in less than the time period), second sources of energization for TR1 and TR2 come into play prior to the voltage drops at O1A and O2A.

These second energy sources for TR1 and TR2 are respective direct connections between the timer relays and supply voltage (12 VDC) made by the energization of a first motion relay MR1. When MR1 is energized normally-open contacts MR1-1 and MR1-1 close completing the direct connections. However both a supply voltage path and a ground return path for MR1 must be simultaneously completed before MR1 is energized. When TR1 is energized (as when the reset switch is actuated to put the system in its normal mode) normally-open contacts TR1-1 close to complete a serial segment of a supply voltage path to MR1, but the path remains incomplete until a door is subsequently opened to de-energize the reset relay and release normally-closed contacts RR-2 which are serially in the supply voltage path for MR1. From the opening of the door, the supply voltage path to MR1 remains completed at least until the expiration of the pre-set time period. The ground return path for MR1 is through a transistor Q5 which must be switched-on, i.e., forward biased to complete the path, and Q5 is switched-on by a signal 26 from a motion sensor whenever vehicle motion is detected by a motion sensor.

Assuming that a hijacking will take less than the pre-set time period, Q5 will be switched-on when the hijacker drives away, at which time Q5 conducts and MR1 is energized. Energization of MR1 keeps TR1 and TR2 energized. MR1 remains energized only until the vehicle is again stopped at which time Q5 cuts off and MR1 is de-energized. If the pre-set time period has expired TR1 and TR2 will also de-energize which results in the opening of contacts TR1-2 and TR2-1 and the disabling of the vehicle. In this case the disabling of the vehicle occurs after the hijacker has driven the vehicle some distance away from the victim so that the hijacker cannot harm the victim in retaliation. The vehicle will remain disabled until the reset switch is again actuated.

If the hijacking takes longer than the pre-set time period, the vehicle will not be in motion prior to the expiration of the time period, and TR1 and TR2 will be de-energized immediately at the end of the time period. In this case the hijacker will not be able to drive off with the vehicle unless he or she can find and actuate the hidden reset switch.

The valet mode is entered from the normal mode by closing the valet switch before opening a door. This closure applies ground potential to one side of normally-closed contacts MR2-1 of a second motion relay MR2 which is connected in serial with normally-open contacts TR2-2 of the second timer relay. If both sets of contacts are closed, this ground potential will be felt at the base of transistor Q4 forward biasing it, and will also be felt at the trigger input TR2B of IC2. The collector of Q4 is connected to ground, and connected from the emitter of Q4 to ground is capacitor C4. The emitter and non-ground side of C4 are also connected to supply voltage through resistor R4 and to two "B" circuit inputs of IC2: threshold input TH2B and discharge input D2B. The trigger input TR2B is also connected to supply voltage through resistor R6. The response of output O2B to the application and removal of a ground potential at its trigger TR2B and the base of Q4 is the same as described above for the "A" circuits, the time constant R4C4 being equal to the R1C1 and R2C2 time constants within conventional tolerances.

Thus, closure of the valet switch when the vehicle is in the normal mode (TR2-2 is closed) before a door is opened, and when relay contacts MR2-1 are closed, causes the "B" circuit output O2B of IC2 to rise to a voltage near the supply voltage, thereby energizing a valet relay VR connected between the output and ground. Whenever VR is energized, the valet relay contacts VR-1 and VR-2 are closed, providing direct connections between TR1 and TR2, respectively, and supply voltage. In this way, the valet relay enables operation of the vehicle, but only as long as VR remains energized. When the valet switch is opened, TR2 is de-energized, or MR2 is energized, the output O2B will, after a delay, drop to close to ground potential and VR will be de-energized. The delay is a function of the R4C4 time constant, and is preferably three minutes—generally the same as the preferred pre-set time period.

The second motion relay MR2 serves the purpose of delaying the de-energization of VR until after TR2 has fully de-energized, under certain circumstances, in order to prevent inadvertent re-triggering of VR. MR2 is energized by the "B" circuit of IC1 under certain conditions whenever the valet switch is closed. Closure of the valet switch applies ground potential to one side of normally-open contacts MR1-3 of the first motion relay. (Recall that MR1 is energized only when the vehicle is moving, the reset relay has been de-energized by a door opening and the energization to TR1 has not timed out). Since the vehicle would normally be stopped before a door is opened to transfer control of the vehicle to a valet, MR1-3 will be open and the ground potential from the closed valet switch will not be felt at the base of transistor Q3 until MR1 is subsequently energized at which time the ground potential will be felt at the base of Q3 forward biasing it, and be felt at the trigger input TR1B of IC1. The collector of Q3 is connected to ground, and connected from the emitter of Q3 to ground is capacitor C3. The emitter and non-ground side of C3 are also connected to supply voltage through resistor R3 and to two "B" circuit inputs of IC1: threshold input TH1B and discharge input D1B. The trigger input TR1B is also connected to supply voltage through resistor R8. The response of output O1B to the application and removal of a ground potential at its trigger TR1B and the base of Q3 is the same as described above for the "A" circuits except that the R3C3 time constant is significantly less, preferably only about 1.5 seconds.

Keeping in mind that the objective of the valet mode is to give an attendant, such as a parking valet or garage mechanic, a pre-set certain amount of time, preferably three minutes, over which the vehicle can be continuously driven before the system shuts the vehicle down, the interaction of MR2 and VR is now addressed.

When the valet switch is closed while the system is in the normal mode, the valet relay VR is energized keeping energy to timer relays TR1 and TR2, via closure of normally-open valet relay contacts VR-1 and VR-2 respectively, and thereby keeping the vehicle operational, i.e. drivable. When a door is subsequently opened to let the driver out and an attendant in, the reset relay is de-energized and MR1 can thereafter be energized whenever vehicle motion is sensed, such as when an attendant subsequently drives the vehicle away or returns it. Energization of MR1 closes normally-open contacts MR1-3 which triggers the "B" circuit of IC1 resulting in the energization of MR2. Energization of MR2 opens normally-closed contacts MR2-1 and thereby removes the trigger voltage from the "B" circuit of IC2. This removal causes, after a delay set by R4 and C4 (a "valet time period"), the de-energization of VR. If the vehicle is stopped before expiration of the valet time period, MR2 will be de-energized (due to the opening of MR1-3), after a short delay of about 1.5 seconds, thereby restoring the trigger voltage to the "B" circuit of IC2. This restoration will cancel the VR time-out and keep VR energized while the vehicle is stopped. If the vehicle is not stopped before the expiration of the valet time period, VR will be de-energized but because MR1 remains energized until the vehicle stops, the vehicle will remain operational until it subsequently stops, at which time TR1 and TR2 will immediately become de-energized due to the openings of MR1-1 and MR1-2, respectively. But MR2 will remain energized for the 1.5 seconds thereafter (due to the charge time of C3) in order to prevent VR from inadvertently being re-energized before contacts TR2-2 have had a chance to open.

Thus in the valet mode, a vehicle is kept operational by VR being energized, but VR can be de-energized if the vehicle is in motion for a period of time greater than the valet time period. Once VR is de-energized and the vehicle is stopped, the vehicle is disabled and will remain so until the hidden reset switch is actuated with the doors closed. This design allows an attendant to drive and stop the vehicle at will as long as the driving periods are not longer than the valet period. If the valet period is set to three minutes and the vehicle is stolen while in the valet mode, the vehicle will become disabled at the first stop after it has been driven continuously for three minutes, and toggling the valet switch will not restore the vehicle to operation.

The motion sensor can be a variety of conventional microwave motion detectors, such as a model MD-3 manufactured by Ramsey Electronics in kit form. Preferably the antenna is mounted underneath a vehicle so that the microwaves are primarily downwardly directed, the purpose being to only measure motion of the vehicle relative to the surface over which it is traveling, not relative to other vehicles or pedestrians. The sensitivity of the detector is preferably set according to a desired minimum detectable speed, such as five miles per hour, below which the detector will not produce a motion signal. This will prevent a thief or hijacker from defeating the system by rolling slowly through stop signs and traffic lights and never fully stopping.

Referring again to FIG. 2, preferably the ground paths for TR1 and TR2 are through a cable 28 which connects the remotely located motion sensor with the rest of the system. Thus if a thief cuts the cable to the motion sensor hoping to disable the security system, the ground return paths for TR1 and TR2 will also be cut. This will immediately disable the vehicle.

R5 and R7 are current limiting resistors. C5 and C7 prevent false triggering of relays TR1 and MR2. D1 and D3 are steering diodes for relay TR1. D5 and D7 are steering diodes for relay MR2. R8 and R6 are current limiting resistors. C6 and C8 prevent false triggering of relays TR2 and VR. D2 and D4 are steering diodes for relay TR2. D6 and D8 are steering diodes for relay VR.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims. For example, in place of a microwave motion detector, motion signals could be derived from the vehicle itself, such as from the odometer system, the alternator system and other pre-existing systems which produce signals as a function of vehicle motion. Also, the switches (reset, valet, etc.) could be switches that are remotely actuated as by radio frequency, infrared, or ultrasonic signals so that the switches could be hidden anywhere in the vehicle, especially the reset switch. In such a case a driver could carry a small remote transmitter in his or her pocket for actuating the switches or only the reset switch, and when a hijacker ejects the driver, the hijacker will also be ejecting the means necessary to reset the system. Also, the event that triggers the hijack delay could be an event in addition to or in place of a door opening, such as the actuation of a separate switch by a driver as he or she is leaving the vehicle.

We claim:

1. A vehicle security system comprising:
   (a) means for arming the system,
   (b) means, responsive to an event when the system is armed, for measuring a pre-set time period from the event,
   (c) means for producing a first signal at the expiration of the time period,
   (d) means for sensing vehicle motion and for producing a second signal in response thereto, and
   (e) means, responsive to the presence of the first signal together with the absence of the second signal, for disabling the vehicle.

2. The system according to claim 1 wherein the means for arming the system comprises:
   (a) switch means for being momentarily actuated,
   (b) first memory means, having at least set and clear states, for remembering an actuation of the switch means, said actuation setting the first memory means,
   (c) second memory means, having at least set and clear states, for remembering the setting of the first memory means, the second memory means being set by the setting of the first memory means, when set the second memory means providing an output signal, and
   (d) means for enabling the vehicle in response to the output signal from the second memory means and for disabling the vehicle in the absence of said output signal.

3. The system according to claim 2 wherein the means for measuring the pre-set time period comprises delay circuit means for producing a signal marking the end of the pre-set time period, the delay circuit means being triggerable by a clearing of the first memory means, the first memory means being clearable by an event.

4. The system according to claim 3 wherein the means for producing the first signal comprises a clearing of the second memory means by the signal marking the end of the pre-set time period, an absence of the output signal from the second memory means being the first signal.

5. The system according to claim 1 wherein the means for disabling the vehicle comprises:
   (a) relay means for actuating at least one set of contacts when the relay means is energized, the at least one set of contacts being in a circuit required for operation of the vehicle, the circuit being disabled whenever the at least one set of contacts is not actuated, and
   (b) means for energizing the relay means whenever the system is armed and the first signal is absent, or while the second signal is present if the second signal occurred before the absence of the first signal.

6. A vehicle security system comprising:
   (a) means for arming the system,
   (b) means, responsive to an event when the system is armed, for measuring a pre-set time period from the event,
   (c) means for disabling the vehicle at the end of the time period, and
   (d) means, responsive to vehicle motion at the end of the time period, for delaying disablement of the vehicle until the vehicle is no longer in motion.

7. The system according to claim 6 wherein the means for arming the system comprises:
   (a) first memory means having at least set and clear states,
   (b) switch means for setting the first memory means, and
   (c) second memory means, having at least set and clear states, for remembering the setting of the first memory means, the second memory means being set in response to the setting of the first memory means, when set the second memory means providing an output signal for use in enabling the vehicle.

8. The system according to claim 7 wherein the means for measuring the pre-set time period comprises:
   (a) delay means for producing a signal marking the end of the pre-set time period, the delay means being triggerable by a clearing of the first memory means, and
   (b) means, responsive to the event, for clearing the first memory means.

9. The system according to claim 8 wherein the means for disabling the vehicle at the end of the time period comprises:
   (a) means for clearing the second memory in response to the signal marking the end of the time period, and
   (b) means for disabling the vehicle in the absence of said output signal.

10. The system according to claim 9 wherein the means for disabling the vehicle in the absence of said output signal comprises:
    (a) relay means for actuating at least one set of contacts when the relay means is energized, the at least one set of contacts being in a circuit required for operation of the vehicle, the circuit being disabled whenever the at least one set of contacts is not actuated, and
    (b) means for de-energizing the relay means whenever the output signal is absent.

11. The system according to claim 6 wherein the event is the opening of a vehicle door.

12. A vehicle security system comprising:
    (a) means, responsive to vehicle motion, for measuring a pre-set time period of continuous vehicle motion,
    (b) means for disabling the vehicle at the end of the time period, and
    (c) means, responsive to vehicle motion at the end of the time period, for delaying disablement of the vehicle until the vehicle is no longer in motion.

13. The vehicle security system according to claim 12 wherein the means for measuring comprises:
    (a) means for sensing motion of the vehicle, and producing a first signal in response thereto,
    (b) means, responsive to each first signal, for measuring the pre-set time period from the initial occurrence of each first signal, and
    (c) means for producing a second signal at the expiration of the time period, the means for measuring being disabled whenever the first signal is not extant; and wherein the means for disabling the vehicle is responsive to the presence of the second signal.

14. A vehicle security system having at least two modes comprising:
   (a) means for selecting between said at least two modes,
   (b) means, responsive to an event when the system is in a first mode, for measuring a first pre-set time period from the event,
   (c) means for disabling the vehicle at the end of the first time period whenever the system is the first mode,
   (d) means, responsive to vehicle motion when the system is a second mode, for measuring a second pre-set time period of continuous vehicle motion, and
   (e) means for disabling the vehicle at the end of the second time period whenever the system is in the second mode.

15. The vehicle security system according to claim 14 further comprising means for delaying disablement of the vehicle in either mode until the vehicle is no longer in motion.

16. The system according to claim 14 wherein the event is the opening of a vehicle door.

17. The system according to claim 15 wherein the event is the opening of a vehicle door.

* * * * *